Aug. 16, 1927.

W. M. BRADSHAW ET AL 1,638,825

REGULATOR SYSTEM

Filed Aug. 28 1925

3 Sheets-Sheet 2

WITNESSES:

INVENTORS
William M. Bradshaw
John H. Ashbaugh
BY
ATTORNEY

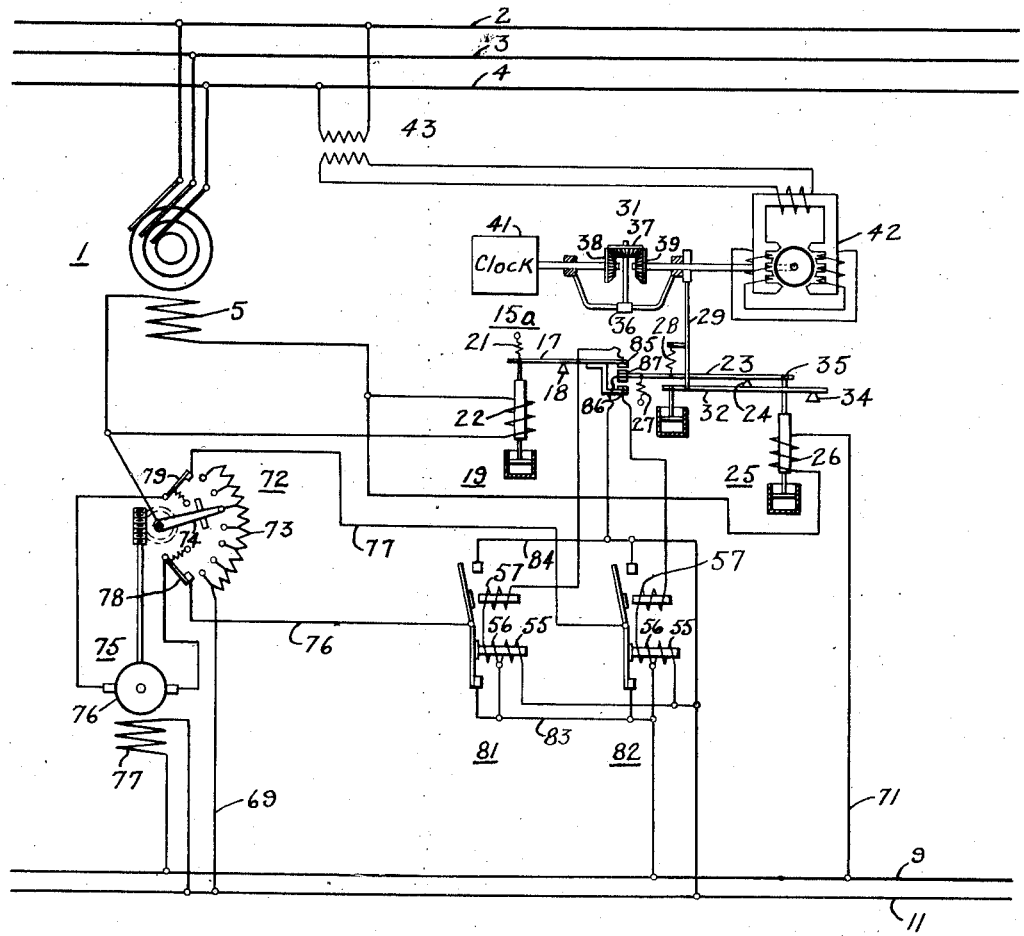

Patented Aug. 16, 1927.

1,638,825

UNITED STATES PATENT OFFICE.

WILLIAM M. BRADSHAW AND JOHN H. ASHBAUGH, OF WILKINSBURG, PENNSYLVANIA, ASSIGNORS TO WESTINGHOUSE ELECTRIC AND MANUFACTURING COMPANY, A CORPORATION OF PENNSYLVANIA.

REGULATOR SYSTEM.

Application filed August 28, 1925. Serial No. 53,044.

Our invention relates to regulator systems and more particularly to systems for governing the excitation of dynamo-electric machines.

One object of our invention is to provide a regulator in which the corrective agency is cumulative, accurate, and quick-acting.

Another object of our invention is to provide a regulator of the above-indicated character with a plurality of anti-hunting means.

Our invention comprises a pair of arms or levers having contact members controlled thereby to govern the excitation of a generator. One of these levers is controlled by a magnet having a winding in series circuit relation with the field winding of the generator, the magnet thus tending to regulate for constant field current. The second of these levers is controlled by a magnet having a winding connected in parallel-circuit relation to the generator field winding. This magnet is responsive to changes in the impressed generator field-winding voltage and thus tends to regulate for constant field-winding voltage.

One of these levers is pivotally mounted to be actuated in accordance with the generated voltage, or other regulated quantity, so as to vary the particular field current and the particular field voltage that the two magnets tend to maintain and that corresponds to stable conditions of the system.

Figure 1:
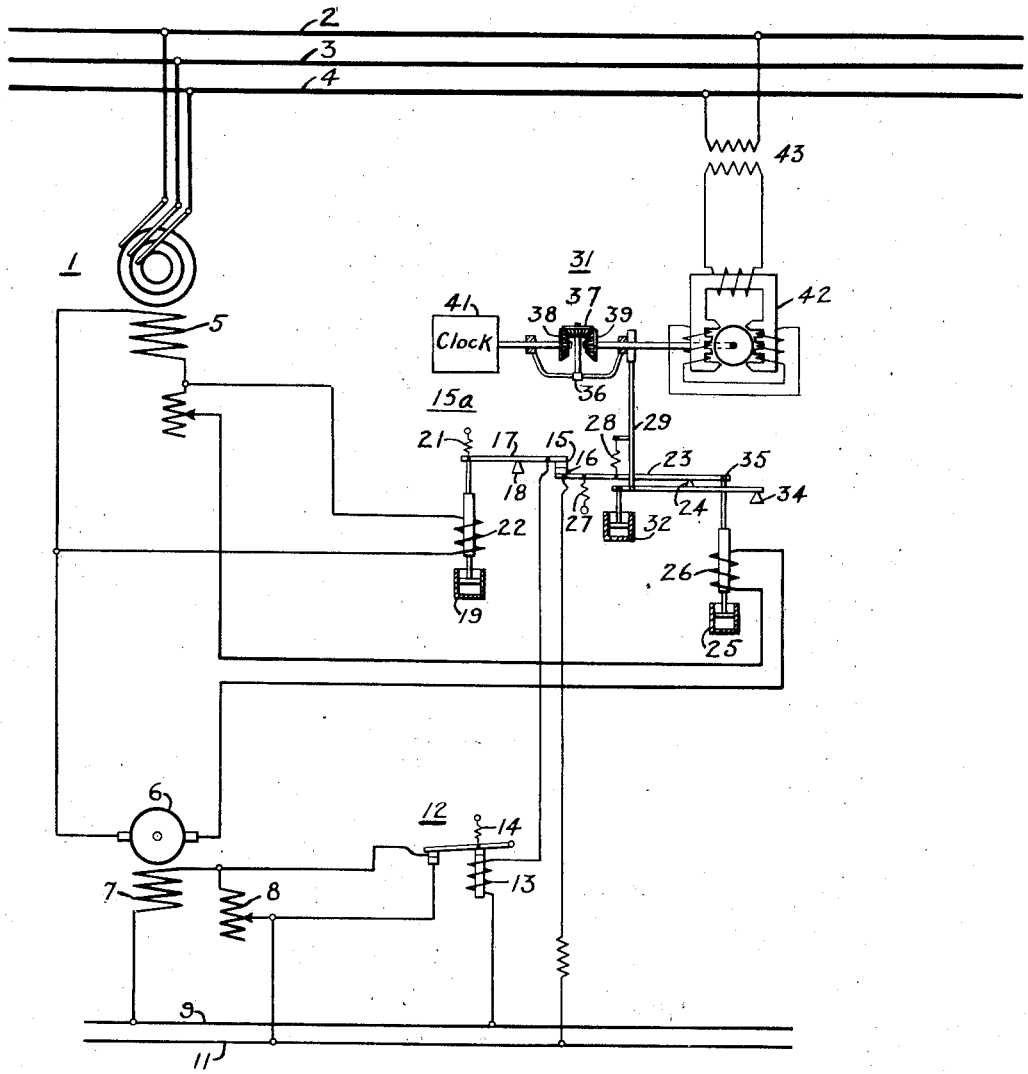

Our invention will be better understood by reference to the accompanying drawings, wherein Figure 1 is a diagrammatic view of one embodiment of the invention as applied to a regulator of the vibratory type and using an induction voltmeter to change the regulator setting.

Figure 2:
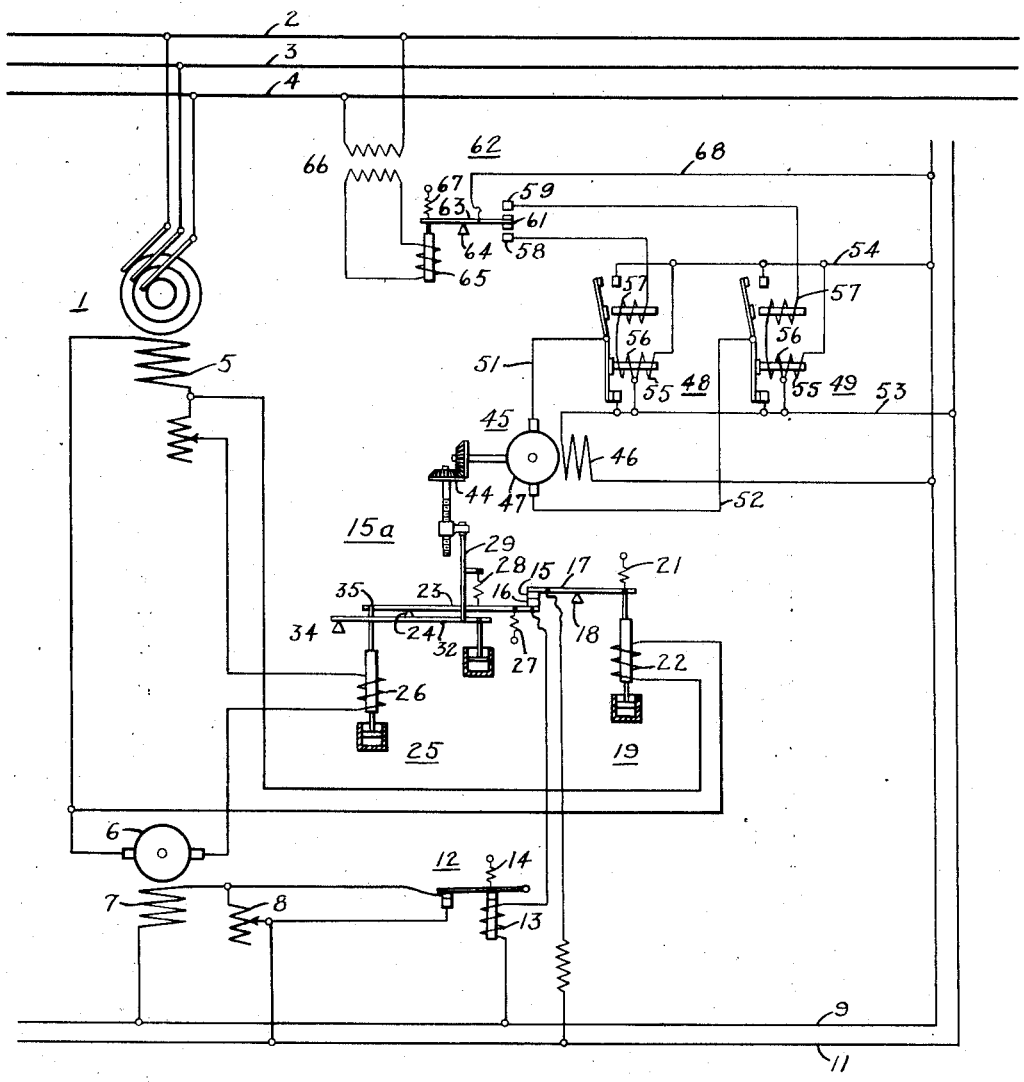

Fig. 2 is a modified form of the invention, using a pilot motor to change the regulator setting, and Fig. 3 is a modified form of the invention, as applied to a rheostatic-type regulator.

Referring to Fig. 1 of the drawing, a generator 1 is connected to a power circuit 2—3—4 and is provided with a field winding 5 that is connected to be energized from an exciter generator 6, the exciter generator being provided with a field winding 7 that is connected through a resistor 8 to direct-current supply conductors 9 and 11.

A relay 12 is connected to have its contact members close a circuit in shunt relation to a selected portion of the resistor 8, and is provided with an operating winding 13 that closes the relay contact members against the pull of a spring member 14, in accordance with the operation of the main regulator contact members 15 and 16.

The contact member 15 of the regulator 15ª is carried by a lever 17 that is mounted upon a fixed pivot 18 and is actuated by an electromagnet 19 against the pull of a spring member 21. The magnet 19 is provided with an operating winding 22 that is connected in parallel-circuit relation to the field winding 5, so as to be responsive to the voltage impressed upon the generator field-winding. The contact member 16 is carried by a lever 23 that is mounted upon a floating pivot 24 and is actuated by an electromagnet 25, the operating winding 26 of which is connected in series circuit relation with the generator field winding 5.

The lever 23 is biased to a neutral position by a pair of spring members 27 and 28. The spring member 27 has one end fixed and the spring member 28 has one end attached to a rod 29 that is actuated in accordance with the movements of a differential device 31. The rod 29 actuates a lever 32 that has one end mounted upon a fixed pivot 34 and carries the floating pivot 24, thereby causing the lever 23 to pivot about the point 35 at which the electromagnet 25 is attached.

The rod 29 is connected by any suitable means, such as by a rack and pinion, to be actuated by the middle element 36 of the differential device 31. The differential device further comprises a planetary gear 37, which drives the element 36, and end gears 38 and 39, one end gear being actuated by a clock mechanism 41, and the other end gear being actuated by an induction voltmeter 42, which is connected to a transformer 43 that is energized in accordance with the voltage of the power circuit 2—3—4.

Referring to Fig. 2 of the drawing, the system therein shown corresponds in part to Fig. 1, as indicated by like reference characters. The rod 29 that operates to change the neutral position of the contact member 16 by varying the tension of spring members 27 and 28, is actuated through a gear and screw mechanism 44 in accordance with the operation of a pilot motor 45. The pilot motor comprises a field winding 46, which is connected to the supply conductors 9 and 11, and an armature winding 47, which is connected by means of conductors 51 and 52 to reversing switches 48 and 49. The reversing switches 48 and 49 are operated as described below to connect the armature of the pilot motor by means of conductors 53 and 54 to the supply conductors 9 and 11 to cause the motor to rotate in the one or the other direction.

Each of the reversing switches 48 and 49 is provided with a holding coil 55 that normally acts to bias the switch to the position illustrated in the drawing. A deenergizing coil 56 is differentially wound with respect to the holding coil and is connected in series circuit relation with an operating coil 57, so that, as the operating coil 57 is energized, the energization of the coil 56 neutralizes the effect of the holding coil 55. The reversing switches 48 and 49 are operated as stationary contact members 58 or 59 are engaged by movable contact member 61 of a voltage responsive relay or contact-making voltmeter 62. The contact member 61 is carried by a lever 63 that is mounted upon a pivot 64 and is actuated in accordance with the energization of an electromagnet winding 65, which is connected, by means of a transformer 66, to the power circuit, 2—3—4 and operates against the pull of a spring member 67. The contact member 61 is connected by means of a conductor 68 to the supply conductor 9, and the contact members 59 and 58 are connected through the reversing switches 48 and 49 and conductor 53 to the supply conductor 11.

Referring to the form of the invention illustrated in Fig. 3 of the drawing, a rheostatic regulator is employed to govern the excitation of the field winding 5. In circuit with the generator field winding a rheostat 72 is provided, having a resistor element 73 and an adjustable arm 74 that is operated by a pilot motor 75. The pilot motor 75 comprises an armature winding 76 and a field winding 77, the field winding being connected to the supply conductors 9 and 11. Conductors 69 and 71, together with magnet coil 26 of the regulator 15ª, serve to complete the circuit of field winding 5 and resistor 73.

The armature winding 76 is connected through limit switches 78 and 79 of rheostat 72 and by means of conductors 76 and 77 to reversing switches 81 and 82. The reversing switches 81 and 82 are each provided with a holding coil 55, a deenergizing coil 56 and an operating coil 57, and are similar in construction to the reversing switches 48 and 49, as described with reference to Fig. 2.

The reversing switches are adapted to connect the pilot motor armature 76 to the supply conductors 9 and 11, by means of conductors 83 and 84. The operating circuits of the reversing switches 81 and 82 are connected to contact members 85 and 86, respectively, which are carried by the lever 17 of regulator 15ª and are adapted to engage a contact member 87 that is carried by floating lever 23. The lever system employed in this form of the device and its connection to the differential device 31 is the same as that described with reference to Fig. 1 of the drawing, the contact member 87 and the lever 23 being held in its neutral position by the spring members 27 and 28.

The operation of the regulator system is as follows: The field-winding voltage magnet 19 operates as a constant-potential regulator for the generator field winding. The particular potential value depends upon the setting of the regulator in accordance with the position of the rod 29. The field-winding current electromagnet 25 operates as a constant-current regulator for the generator field winding, the particular value of current also depending upon the setting of the rod 29, which controls the tension of the spring members 27 and 28 and the position of the floating pivot 24.

There are, therefore, two regulating elements, one regulating to maintain constant current, and the other to maintain constant voltage on the generator field winding. When the voltage of the generator varies from the value corresponding to the speed of the clock mechanism 41, (Figs. 1 and 3) the induction voltmeter 42 will actuate the rod 29 so as to change the setting of the regulator, in such manner as to raise or lower the voltage of the generator, as may be necessary to cause the voltage and speed of the induction voltmeter to again agree with the speed of the clock mechanism 41.

The corrective tendency of the regulator is accumulative, inasmuch as a variation in the speed of the induction voltmeter from that of the clock mechanism causes the differential device 31 to vary the position of the rod 29 to a greater degree as the duration of the voltage variation from the desired value continues. It will also appear that, as the voltage varies from the desired value, the rate of change of the setting of the regulator which is caused by the movement of the rod 29 in the one or in the other direction, will depend upon the degree of voltage variation and will continue until the proper voltage adjustment has been made. This characteristic causes the regulator to be very fast in its operation.

The voltage magnet 19 being responsive to variations in the voltage impressed upon the generator field-winding, acts as an antihunting device. The action of the magnet 19 is to advance the time at which a corrective movement of regulator will be completed.

The current magnet 25 also acts as an anti-hunting device and is responsive to the current flowing in the generator field-winding circuit. This magnet is also responsive to changes of load upon the generator inasmuch as the change in load causes a change in the excitation current because of the mutual inductance of the generator field and armature windings. In this way, the winding 26 of the current magnet 25 anticipates changes in voltage that accompany changes in load upon the generator and causes the correction for voltage variation to be much faster than if the correction were dependent only upon the variations indicated by the induction voltmeter.

The operation of the form of the invention illustrated in Fig. 2 is similar to that illustrated in Fig. 1, except that the rod 29 for changing the regulator setting is actuated by the pilot motor 45, in accordance with the voltage variations of the generator, as indicated by the contact making voltmeter 62, which may be of any well known form.

The operation of the form of the invention illustrated in Fig. 3, is similar to that illustrated in Fig. 1, with the exception that instead of using a relay to intermittently short-circuit a resistor in circuit with the generator field winding to vary the field excitation, a motor-operated rheostat 72 is used. This construction necessitates providing the lever 17 with a pair of contact members 85 and 86 that are adapted to engage the contact member 87, which is carried by the floating lever 23. These contact members cooperate to actuate the reversing switches 81 and 82, thereby causing the rheostat motor 75 to be operated in the one or the other direction to vary the generator voltage as required.

While the foregoing description has had particular reference to the voltage regulation of a generator, the excitation of any dynamo-electric machine may be varied in accordance with any desired electrical quantity of a circuit by actuating the rod 29 in accordance with variations of the regulated quantity.

Many other changes may be made in the details and arrangement of the apparatus and circuits that are disclosed in the specification, without departing from the spirit of our invention, and we do not wish to be limited other than by the scope of the appended claims.

We claim as our invention:

1. In combination, a dynamo-electric machine having a field winding, means for regulating the excitation of said field winding comprising two cooperating contact members, means for actuating one of said contact members in accordance with the voltage impressed on said field winding, and means for actuating the other of said contact members in accordance with the current flowing through said field winding.

2. In combination, a dynamo-electric machine having a field winding, means for regulating the excitation of said field winding comprising two cooperating contact members, means for actuating one of said contact members in accordance with the voltage impressed on said field winding, and means for actuating the other of said contact members in accordance with the current traversing said field winding, said last-named contact member having a neutral position, and means actuated in accordance with the voltage of said machine for varying said neutral position.

3. In combination, a dynamo-electric machine having a field winding, means for regulating the excitation of said field winding comprising a plurality of cooperating contact members, means comprising two levers for operating said contact members, and means for actuating said levers in accordance with variations in the field excitation of said machine, one of said levers having a neutral position.

4. In combination, a dynamo-electric machine having a field winding, means for regulating the energization of said field winding comprising a plurality of cooperating contact members, means comprising levers for operating said contact members, means for actuating said levers, one of said levers having a neutral position, and means for adjusting said neutral position in accordance with the voltage of said dynamo-electric machine.

5. In combination, a dynamo-electric machine having a field winding, means for regulating the excitation of said field winding comprising a plurality of cooperating contact members, means comprising levers for operating said contact members, pivots for supporting said levers, and means for adjusting one of said pivots in accordance with the voltage of said dynamo-electric machine.

6. In combination, a dynamo-electric machine having a field winding, means for regulating the excitation of said dynamo-electric machine comprising a plurality of contact members, a pair of levers for operating said contact members, means for actuating said levers, one of said levers being mounted upon a floating pivot and being provided with means for normally biasing said lever to a predetermined position, and means actuated in accordance with the voltage of said machine for varying the position of said pivot and the normal position of said lever.

7. In combination, a dynamo-electric machine having a field winding, means for regulating the excitation of said field winding comprising a plurality of contact members, means for actuating said contact members, means for biasing one of said contact members to a neutral position, and means actuated in accordance with the voltage of said machine for varying the neutral position of said contact member.

8. In combination, a dynamo-electric machine, means for regulating the voltage of said machine comprising a plurality of contact members, means for actuating said contact members, means for biasing one of said contact members to a neutral position, and means actuated in accordance with the voltage variations of said machine for varying the neutral position of said contact members.

9. In combination, a dynamo-electric machine having a field winding, means for regulating the excitation of said field winding comprising two contact members, means for actuating one of said contact members in accordance with the excitation current of said field winding, and means for actuating the other of said contact members in accordance with the excitation voltage of said field winding.

10. In combination, dynamo-electric machine having a field winding, means for regulating the excitation of said field winding comprising two contact members, means for actuating one of said contact members in accordance with the excitation current of said field winding, means for actuating the other of said contact members in accordance with the excitation voltage of said field winding, and means actuated in accordance with the voltage of said machine for modifying the action of said contact members.

In testimony whereof, we have hereunto subscribed our names this 24th day of August, 1925.

WILLIAM M. BRADSHAW.
JOHN H. ASHBAUGH.